(12) United States Patent
Herdendorf et al.

(10) Patent No.: US 11,790,946 B2
(45) Date of Patent: Oct. 17, 2023

(54) MAGNETICALLY REPOSITIONABLE CASSETTES WITHIN A DATA STORAGE DRIVE

(71) Applicant: Seagate Technology LLC, Fremont, CA (US)

(72) Inventors: Brett R. Herdendorf, Mound, MN (US); Riyan Alex Mendonsa, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 1 day.

(21) Appl. No.: 17/665,234

(22) Filed: Feb. 4, 2022

(65) Prior Publication Data
US 2023/0253013 A1 Aug. 10, 2023

(51) Int. Cl.
*G11B 17/22* (2006.01)
*G11B 33/14* (2006.01)
*G11B 5/48* (2006.01)
*G11B 5/55* (2006.01)

(52) U.S. Cl.
CPC .......... *G11B 17/225* (2013.01); *G11B 17/228* (2013.01); *G11B 33/1446* (2013.01); *G11B 5/4813* (2013.01); *G11B 5/5569* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 5,395,199 A * | 3/1995 | Day, III et al. | G11B 17/225 360/92.1 |
| 8,112,580 B2 | 2/2012 | Bandic et al. | |
| 8,958,173 B1 | 2/2015 | Hirano et al. | |
| 9,025,277 B1 | 5/2015 | Hirano | |
| 2012/0185079 A1* | 7/2012 | Bacom et al. | G11B 17/225 700/214 |
| 2012/0287532 A1* | 11/2012 | Acevedo et al. | G11B 17/22 360/92.1 |

(Continued)

FOREIGN PATENT DOCUMENTS

GB 2054506 A 2/1981

OTHER PUBLICATIONS

"XPlanar: Planar Motor System", Beckhoff Product Description; https://www.beckhoff.com/en-us/products/motion/xplanar-planar-motor-system/xplanar-planar-motor-system.html. Accessed Feb. 3, 2022.

*Primary Examiner* — Craig A. Renner
(74) *Attorney, Agent, or Firm* — HOLZER PATEL DRENNAN

(57) ABSTRACT

The presently disclosed technology is directed to maximizing cleanliness, reliability, and space efficiency within a jukebox-style HDD, while minimizing overall cost of the HDD. In an effort to reduce the movement of a robotic arm assembly, cassettes within a jukebox-style HDD may be configured to be magnetically repositionable to replace some of the movement of the robotic arm assembly, without adding another significant source of potential mechanical failure within the HDD enclosure. Further, the overall number of moving parts is reduced, which may improve reliability of the HDD, as well as cleanliness within the HDD enclosure.

20 Claims, 10 Drawing Sheets

(56) References Cited

U.S. PATENT DOCUMENTS

| | | | |
|---|---|---|---|
| 2013/0054006 A1* | 2/2013 | McClelland | G11B 15/6835 700/218 |
| 2014/0211602 A1* | 7/2014 | Hetzler et al. | G11B 15/6835 369/75.11 |
| 2015/0002958 A1* | 1/2015 | Altknecht et al. | G11B 15/26 360/74.1 |
| 2015/0055444 A1* | 2/2015 | Bacom et al. | G11B 17/225 369/75.11 |
| 2021/0155407 A1* | 5/2021 | Austrheim et al. | G05B 19/41895 |
| 2023/0054813 A1* | 2/2023 | Herdendorfetai. | G11B 17/225 |

* cited by examiner

MAGNETICALLY REPOSITIONABLE CASSETTES WITHIN A DATA STORAGE DRIVE

BACKGROUND

Hard disc drives (HDDs) are traditionally constructed with a dedicated reader/writer for each readable/writable surface of one or more magnetic discs contained within an HDD. In the interest of achieving greater data density and/or lower cost, some HDDs may include one or more cassettes, each including numerous magnetic discs, all of which share one or more common read/write players within an HDD enclosure. Example implementations of this HDD media arrangement may be found in cloud computing data storage, cold data storage, and HDD juke boxes, for example. Each of these implementations exchange speed in reading to and/or writing data from any one of the magnetic discs within the cassette(s) for the lower cost of shared read/write player(s) and higher overall capacity in a given physical space requirement, as compared to traditional HDDs.

In an HDD juke box, for example, a robotic arm moves within the HDD enclosure to retrieve a desired magnetic disc from a cassette, move the magnetic disc to a common read/write player for read/write operations, and return the magnetic disc to the cassette when the read/write operations are complete. Such an arrangement requires that the robotic arm have a great degree of freedom of movement as it moves between the cassettes and the common read/write players that are generally fixed in position within the HDD enclosure. The great degree of freedom of movement of the robotic arm is a significant source of potential mechanical failure. Any resulting plume of debris caused by a mechanical failure may affect all the magnetic discs within the HDD enclosure. As a result, a mechanical failure event that occurs in a shared read/write player HDD has the potential to damage not one, but potentially all magnetic discs within the HDD. This causes a potential risk of much more data loss and a greater cost of replacing multiple magnetic discs within shared read/write player HDDs, as compared to traditional HDDs. A single crash could be the same as crashing 30 or more HDDs, resulting in hundreds of hours of rebuild time, for example.

SUMMARY

Implementations described and claimed herein address the foregoing problems by providing a data storage device comprising a magnetic rail assembly including two or more cassette staging positions. Each of the cassette staging positions includes one or more electromagnets and one of the cassette staging positions further defined as an active cassette position. The data storage device further comprises two or more cassettes arranged on the cassette staging positions of the magnetic rail assembly. One of the cassettes arranged on the active cassette position is further defined as an active cassette and each cassette includes an array of data storage discs. The data storage device still further comprises a shared read/write player to selectively receive one of the data storage discs from the active cassette as an active disc. The shared read/write player performs data access operations on the active disc.

Implementations described and claimed herein address the foregoing problems by further providing a method of operating a data storage device comprising providing a magnetic rail assembly including two or more cassette staging positions. Each of the cassette staging positions includes one or more electromagnets and one of the cassette staging positions is further defined as an active cassette position. The method further comprises rotating two or more cassettes arranged on the cassette staging positions of the magnetic rail assembly along the magnetic rail assembly. One of the cassettes arranged on the active cassette position is further defined as an active cassette and each cassette includes an array of data storage discs. The method still further comprises receiving one of the data storage discs from the active cassette as an active disc to a shared read/write player. The shared read/write player performs data access operations on the active disc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTION

The presently disclosed technology is directed to maximizing cleanliness, reliability, and space efficiency within a jukebox-style HDD, while minimizing overall cost of the HDD. As discussed above, in traditional jukebox-style HDDs, a robotic arm assembly has a great degree of freedom of movement as it moves between cassettes and common read/write players that are generally fixed in position within an HDD enclosure. The great degree of freedom of movement of the robotic arm assembly is a significant source of potential mechanical failure. Any resulting plume of debris caused by a mechanical failure may affect all the magnetic discs within the HDD enclosure.

In an effort to reduce the movement of the robotic arm assembly, the cassettes may be configured to move within the HDD enclosure in place of some movement of the robotic arm assembly. However, a system of motors and mechanical systems to effect the movement of the cassettes creates another significant source of potential mechanical failure, the result of which could similarly affect all the magnetic discs within the HDD enclosure. The presently disclosed magnetically repositionable cassettes replaces some of the movement of the robotic arm assembly, without adding another significant source of potential mechanical failure within the HDD enclosure. Further, the overall number of moving parts is reduced, which may improve reliability of the HDD, as well as cleanliness within the HDD enclosure.

Still further, the presently disclosed magnetically repositionable cassettes within the jukebox-style HDD may be physically isolated from the robotic arm assembly and the common read/write players via one or more internal access doors (e.g., a cassette compartment door). Thus, a magnetic disc currently being read from or written to may be physically isolated from other magnetic discs within the shared read/write player HDD. As a result, in the event of a mechanical failure of the robotic arm assembly or a head-media contact event within the common read/write player(s), any resulting plume of debris only affects the magnetic disc(s) currently being read or written. The remaining magnetic discs within the cassettes are isolated from the plume of debris. Any event (e.g., a mechanical failure of the robotic arm assembly or a head/media contact event) that results in a plume of debris within the HDD is referred to herein as an HDD failure or a failure event, and the presently disclosed technology is directed at reducing the likelihood and mitigating the impact of such failure events.

Figure 1:
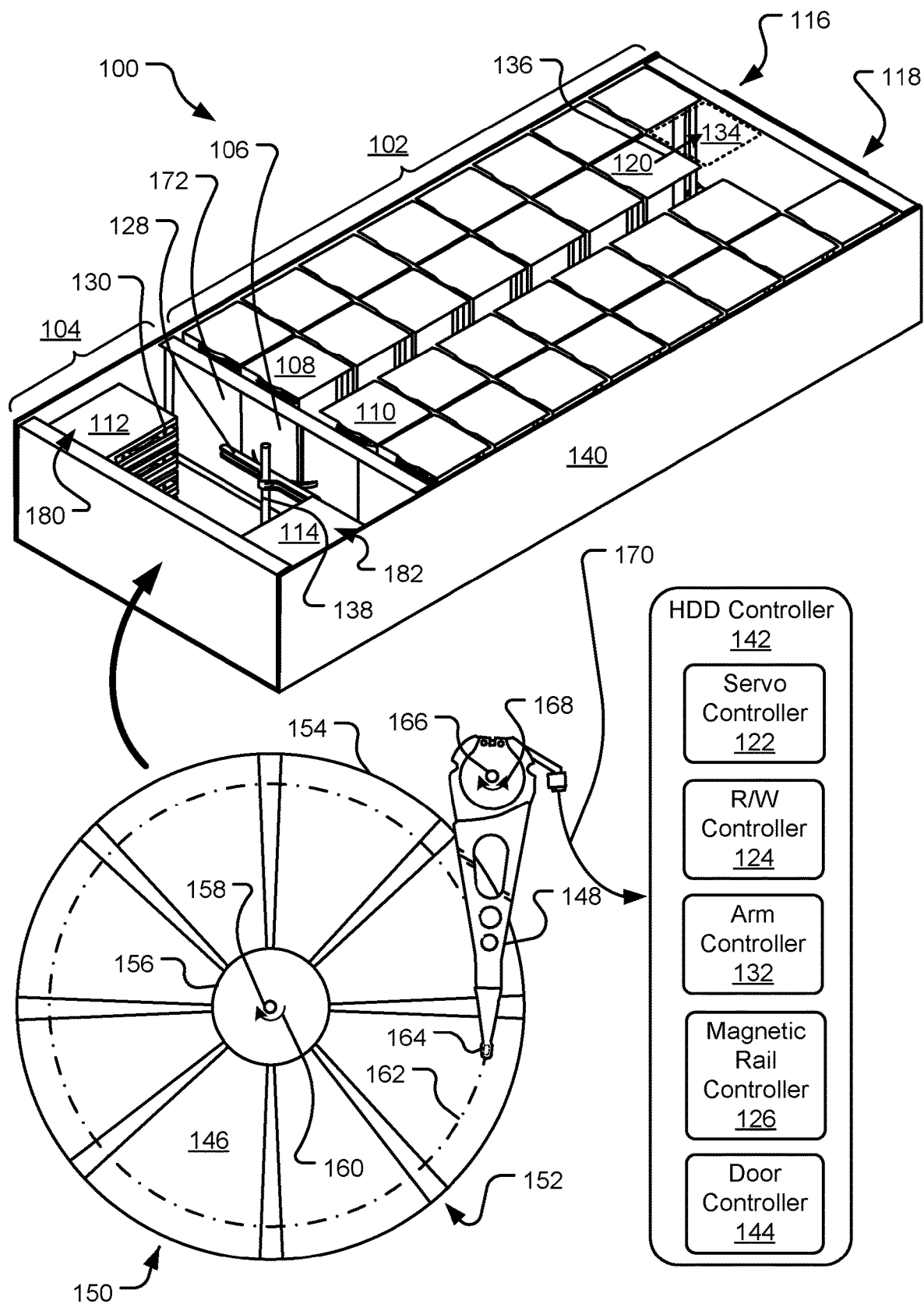
FIG. 1 illustrates an example hard disc drive (HDD) including an array of magnetically repositionable data storage cassettes and shared read/write players, as well as an example storage platter.

FIG. 1 illustrates an example hard disc drive (HDD) 100 including an array of magnetically repositionable data storage cassettes and shared read/write players, as well as an example storage platter 146. The HDD 100 includes an enclosure 140 divided into a cassette compartment 102, a read/write compartment 104, and a magnetic control compartment (located underneath the cassette compartment, not shown), each of which is closed off from the others, primarily to isolate the cassette compartment 102 in the event of a failure event that occurs in the read/write compartment or the magnetic control compartment. The HDD 100 is illustrated without a top panel of the enclosure 140 for the purposes of illustrating internal components of the HDD 100, such as cassettes (e.g., cassettes 108, 110) within the cassette compartment 102 and shared read/write players (e.g., read/write players 112, 114) and a robotic arm assembly (including at least a moveable frame 138 and a robotic arm 128) within the read/write compartment 104.

The cassette compartment 102 and/or the read/write compartment 104 may be water-tight and/or air-tight and may establish an inert environment (e.g., a helium or nitrogen gas mixture, a low water vapor mixture, etc.) within the HDD 100. The inert environment may be maintained at atmospheric pressure, or a predetermined higher or lower differential pressure referenced to atmospheric pressure. Tight control of the environment within the HDD 100 may prolong longevity of the HDD 100, particularly when used in conjunction with a cassette compartment door 106 to prevent a device failure event (e.g., a head-media contact event) within the read/write compartment 104 from negatively impacting the environment within the cassette compartment 102.

The cassettes within the cassette compartment 102 are arranged within HDD 100 in two magnetic rail circuits 116, 118, each with predefined staging positions for the cassettes. At least one of the staging positions in each of the magnetic rail circuits 116, 118 is accessible by the robotic arm assembly and referred to herein as an active cassette position. The cassettes in each of the circuits 116, 118 may change position to vary which of the cassettes are in active cassette positions. For example, cassettes 108, 110 of circuits 116, 118, respectively, are illustrated in FIG. 1 in active cassette positions so that the robotic arm assembly may selectively retrieve storage platters therefrom or return storage platters thereto. When in the active cassette positions, the cassettes 108, 110 are referred to herein as active cassettes. When an inactive cassette at another staging position within one of the circuits 116, 118 is requested (e.g., cassette 120), the circuit containing the requested cassette (e.g., magnetic rail circuit 116) rotates the positions of its cassettes to move the previously inactive cassette to the active cassette position within the magnetic rail circuit 116, thus making the cassette an active cassette. This may be accomplished by rotating the positions of the cassettes individually and sequentially to occupy a vacant position (e.g., cassette 120 moves to occupy vacant position 134 as illustrated by arrow 136 and the vacant position 134 moves to the position formally occupied by the cassette 120), or similarly as groupings of cassettes.

Each of the cassettes within the HDD 100 includes a stack of storage platters (also referred to herein as data storage discs or magnetic discs), such as the storage platter 146, in an inactive state (referred to herein as inactive discs). As an example, each of the cassettes may hold 100 storage platters for a total of 200 storage platters held within the HDD 100. The shared read/write players of FIG. 1 are arranged as stacks 180, 182 of read/write players, each stack containing at least four shared read/write players (e.g., shared read/write player 112 is the top read/write player of stack 180 and shared read/write player 114 is the top read/write player of stack 182. In some implementations, each of stacks 180, 182 is used to access storage platters from one of the circuits 116, 118. In other implementations, each of stacks 180, 182 is used to access storage platters from both of the circuits 116, 118. In other implementations, the HDD 100 may include as few as a singular shared read/write player or more shared read/write players than depicted, arranges in one or more stacks.

Each of the shared read/write players may hold one of the storage platters from the cassettes in a receptacle (e.g., receptacle 130) or tray and perform read/write operations on that storage platter in an active state (referred to herein as an active disc). Storage platter 146, described in detail below, is representative of one of the storage platters of the cassettes and selectively accessed by the shared read/write players. Some or all of the storage platters within the cassettes may have the same or similar features to that of storage platter 146. Further, other implementations may have a fewer or a greater number of cassettes than that depicted in FIG. 1.

The storage platter 146 is a round disc arranged in a series of spaced servo wedges (e.g., servo wedge 152) and data wedges (e.g., data wedge 150) within an outer diameter 154 and an inner diameter 156 of the storage platter 146, between which are a number of substantially circular concentric data tracks making up an entirety of the readable and/or writable surface area of the storage platter 146.

Specific locations on the storage platter 146 may be defined by any available addressing scheme (e.g., cylinder-head-sector (CHS) addressing and logical block addressing (LBA) schemes).

When mounted within a shared read/write player, the storage platter 146 rotates at high speed about platter spindle 158 (as illustrated by arrow 160), as information is written to and/or read from data tracks (e.g., track 162) within the data wedges on the storage platter 146. The information is written to and/or read from the storage platter 146 via actuator arm 148 and its respective slider 164. More specifically, in the depicted example, the actuator arm 148 pivots about actuator spindle 166 using a servo motor (or voice-coil motor (VCM), not shown) during a seek operation to locate the data track 162 on the storage platter 146, as illustrated by arrow 168. The actuator arm 148 extends toward the storage platter 146 and the slider 164 is located at an end of the actuator arm 148 distal from the actuator spindle 166. The slider 164 flies in close proximity above the storage platter 146 while the storage platter 146 rotates about the platter spindle 158.

The platter spindle 158 and actuator arm 148 and its respective slider 164 are all components of a shared read/write player (e.g., shared read/write players 112, 114). Some or all of the shared read/write players within the stacks 180, 182 may have the same or similar features. Other implementations may include multiple actuator arms and/or sliders with associated transducer heads. Still further implementations may utilize actuator arm(s) that move linearly rather than rotationally to access data tracks on the storage platter 146.

The storage platter 146 includes an array of embedded independent magnetic domains and the slider 164 includes an array of microelectronic components (e.g., a read element, a write element, thermal actuators, other head-media spacing micro-actuators, etc., not shown). The read element is magneto-resistive, which allows it to read data from the magnetic domains as they pass underneath the read element. The write element generates magnetic fields that selectively change polarity of the magnetic domains of the storage platter 146 as they pass underneath the write element, which allows the write element to write data to the storage platter 146.

A flex cable 170 provides electrical connection paths from an HDD controller 142 to the various microelectronic components attached to the actuator arm 148 and the slider 164. The HDD controller 142, various functions of which are discussed in detail below, may be implemented as a controller system-on-chip (SoC) or a control board (e.g., incorporated on a printed circuit board (PCB)), for example. The flex cable 170 transmits data signals from the read element and/or to the write element, while allowing pivotal movement of the actuator arm 148 during read/write operations on the storage platter 146 while mounted within the shared read/write player 112. In various implementations, the HDD controller 142 is shared amongst some or all of the shared read/write players, or each of the shared read/write players includes an HDD controller specific to that shared read/write player.

While a singular actuator arm 148 is illustrated accessing the depicted side of the storage platter 146, the storage platter 146 may include data storage on both planar sides of the storage platter 146 (i.e., the depicted side and its opposing non-depicted side). In such cases, the actuator arm 148 is actually a pair of actuators arms, each assigned to one of the planar sides of the storage platter 146. The pair of actuators arms may rotate together or independently about the actuator spindle 166 to read from/write to the storage platter 146.

The HDD 100 includes a cassette partition 172 and a cassette compartment door 106 that selectively permits the robotic arm assembly access through the cassette partition 172 to the cassette compartment 102 when open, and seals off the cassette compartment 102 from the read/write compartment 104 when closed. The cassette compartment door 106 is made up of a pair of sliding panels that slide away from one another to open and slide toward one another to abut when closed. Other implementations may include greater or fewer sliding panels to make up the cassette compartment door 106 or another door mechanism altogether. The cassette compartment door 106 may be electrically, pneumatically, or hydraulically actuated, with or without limit switches to define its overall travel. When the cassette compartment door 106 is in the depicted closed position, any failure event that occurs in the read/write compartment 104 is isolated from the cassette compartment 102 and prevented from contaminating the storage platters stored within the cassettes.

The HDD controller 142 controls operation of the HDD 100, including but not limited to the shared read/write player(s), the robotic arm assembly, a magnetic rail (not shown, see e.g., magnetic rail assembly 242 of FIG. 2) for repositioning the cassettes within the cassette compartment 102, and the cassette compartment door 106, as described in further detail below. By example and without limitation, the HDD controller 142 includes a servo controller 122, a read/write (R/W) controller 124, a robotic arm controller 132, a magnetic rail controller 126, and a cassette compartment door controller 144. The controller 142 is intended to represent a collection of hardware and software elements, including for example control instructions executed by one or more separate or shared device controllers (e.g., microprocessors), peripheral interface controllers (PICs), application-specific integrated circuits (ASICs), systems on chips (SoCs), etc. Some or all of the hardware utilized by the controller 142 may be included on a printed circuit board mounted to the HDD 100.

The servo controller 122 directs various operations of the shared read/write player(s), including but not limited to operation of a first motor controlling a platter spindle to control rotation of an active storage platter within each of the shared read/write player(s) and operation of a second motor controlling an actuator spindle to control rotation of an actuator arm within each of the shared read/write player(s). The servo controller 122 may select whether the shared read/write player(s) are in a standby mode (i.e., the active storage platter is not spinning, and a corresponding slider is parked) or the shared read/write player(s) are in an active mode (i.e., the active storage platter is spinning at a high speed and the slider is flying above the active storage platter). In the active mode, the active storage platter(s) are ready for read/write operations.

Figure 10:
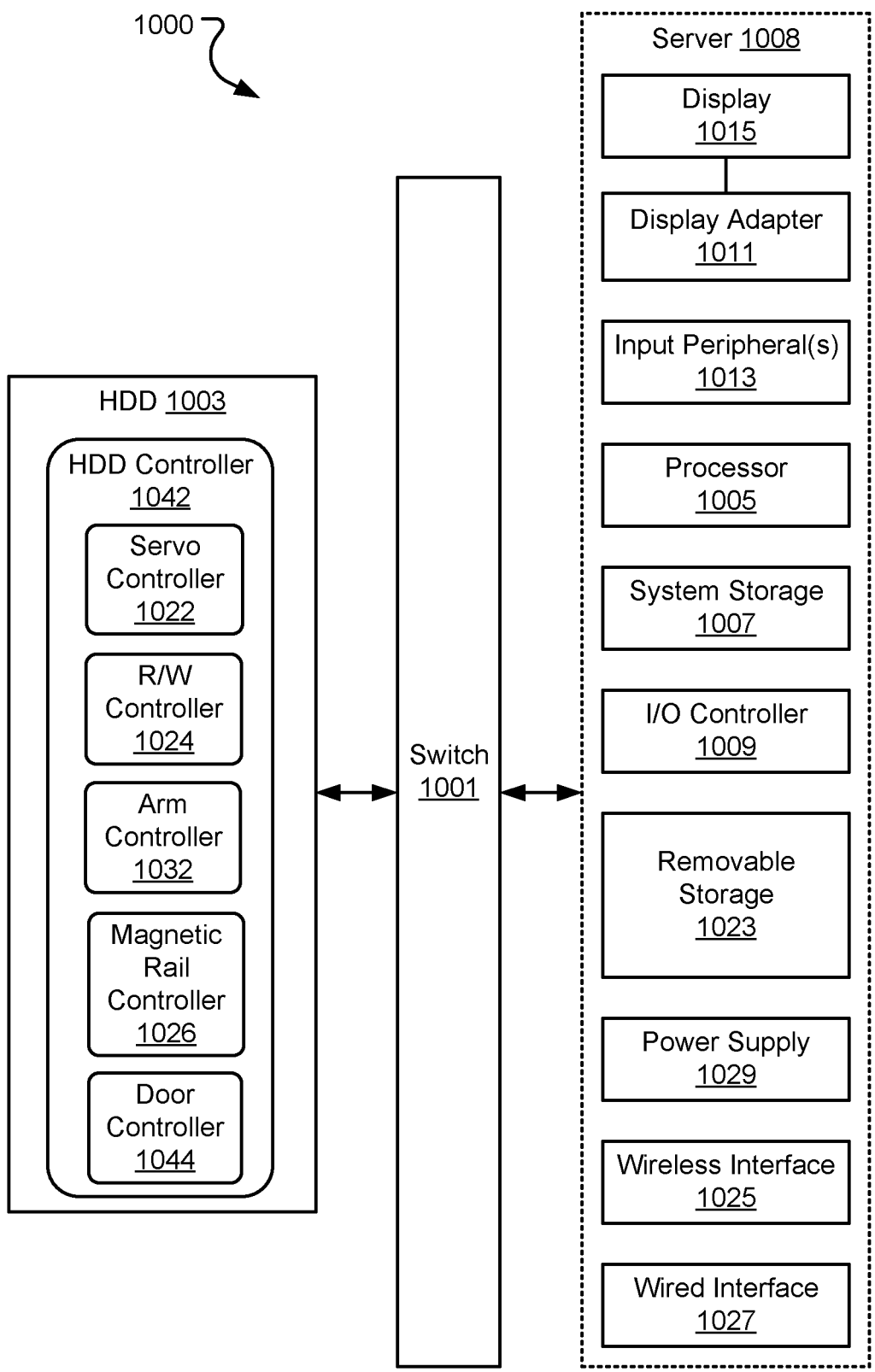
FIG. 10 illustrates an example system diagram of a computing system suitable for operating an HDD with magnetically repositionable data storage cassettes and shared read/write players.

The R/W controller 124 executes read and/or write commands received from a server (such as a system host or client, not shown, see e.g., server 1008 of FIG. 10) on the active storage platter(s). For example, the R/W controller 124 may open a read/write channel, select a preamplifier and configure preamplifier settings for R/W operations, and/or control other electronics that facilitate data access operations (e.g., read and/or write access) to the active storage platter(s). The robotic arm controller 132 directs operation of a robotic arm assembly, which in turn includes at least the moveable frame 138 and the robotic arm 128 to selectively physically move the storage platters between active cassettes 108, 110 and the shared read/write player(s).

The magnetic rail controller 126 directs operation of a magnetic rail, including selectively energizing electromagnets embedded within the magnetic rail. This causes the cassettes to rotationally shift position within one or both of the circuits 116, 118 and move a desired one of the cassettes in each of the circuits 116, 118 into an active position where the robotic arm assembly may access the storage platters therein. The magnetic rail controller 126 may take the form of a centralized controller that directs the operation of the entire magnetic rail or a distributed controller than has its functionalities spread across multiple magnetic tiles within a modular magnetic rail.

The door controller 144 directs operation of the cassette compartment door 106, and thus access to the cassettes 108, 110. For example, the HDD 100 may start in an off or standby condition with the cassette compartment door 106 closed and no active disc in the shared read/write player(s). When the HDD controller 142 receives a read from/write to request for one of the inactive storage platters stored within the cassettes 108, 110, the door controller 144 directs the cassette compartment door 106 to open so that the robotic arm assembly may retrieve the requested storage platter from one of the cassettes 108, 110. Once the requested storage platter is retrieved, the door controller 144 may direct the cassette compartment door 106 to close. The robotic arm assembly places the requested storage platter within a shared read/write player for read/write operations thereon. In some implementations, there may be additional internal access doors within the interior cavity of the HDD 100 that may offer additional or different internal isolation of HDD 100 components. In other implementations, the cassette compartment door 106 is omitted and there is not physical separation between the cassette compartment 102 and the read/write compartment 104 within the HDD 100.

The HDD 100 depicted with cassette compartment door 106 closed is operating in one of several states. First, the HDD 100 may be in a full standby or off state, where it is not currently in use. All of the storage platters are stowed in their respective slots or grooves within the cassettes and the shared read/write players are empty. For example, in the depicted standby or off state, maintenance operations (e.g., repair and/or replacement of components) may be performed on the HDD 100 whereby a technician may access the interior of the enclosure 140 and expose the internal components to potential contamination from an external environment. With the cassette compartment door 106 in a closed position, the cassettes may remain substantially isolated even when the technician accesses the read/write compartment 104 for maintenance for repair. Similarly, the shared read/write players, any active storage platters therein, and the robotic arm assembly may remain substantially isolated even when the technician accesses the cassette compartment 102 for maintenance for repair.

The HDD 100 depicted with the cassette compartment door 106 in a closed position may also be operating in a partial standby or an active read/write state. All of the storage platters except those contained within shared read/write players are stowed in their respective slots or grooves within the cassettes (referred to herein as the inactive discs) and the shared read/write players that are in active use contain one storage platter in their respective receptacles or trays, each of which are referred herein as active discs. The cassette compartment door 106 is in a closed position to isolate the storage platters within the cassettes from the read/write compartment 104 as much as possible. When operating in the partial standby state, the active discs are loaded within their respective shared read/write players, but the active discs are not currently spinning. In the partial standby state, the cassette compartment door 106 is available to be opened, as requested by the HDD controller 142, in some implementations to change out the active discs, as described in further detail below.

When operating in the active read/write state, one or more active discs are loaded and spinning within the shared read/write players and data is currently being read from or written to the active disc(s). In some implementations, the active read/write state also includes time periods immediately before and immediately after a read/write operation where the active disc(s) remain spinning, but data is not currently being read from or written to the active disc(s). In the active read/write state, the cassette compartment door 106 is not available to be opened (also referred to herein as locked), as enforced by the HDD controller 142, particularly to protect the inactive storage platters stowed within the cassettes from a head-media contact event (also referred to herein as a disc crash or a failure event) within the read/write compartment 104.

In some implementations, the HDD 100 may take the form of a tray (e.g., a 4U chassis) within a data storage rack. The data storage rack forms a structural framework for mounting a variety of information technology (IT) equipment. One or several data storage racks may be used within a variety of businesses to house equipment to meet IT needs. Numerous data storage racks may be used within data centers for cloud computing data storage, for example.

Data storage racks may be designed to accommodate a common physical size and shape format for the IT equipment. Accordingly, in additional to the depicted HDD 100, a variety of IT equipment may be also located within the data storage rack to meet its intended purpose. For example, the data storage rack may include a router that serves to direct data flow to and from the data storage rack and a server to run programs and/or provide functionality for external devices, such as a client (in a client-server model). The server can provide various functionalities, referred to herein as services, such as retrieving requested data for the client from the HDD 100 or storing incoming data from the client on the HDD 100. The server may also share data or resources among clients or perform computations for the client. The data storage rack may further include a network switch that serves to interconnect the IT equipment within the data storage rack and a power supply to receive and convert incoming power to a voltage, current, and frequency appropriate to power the IT equipment within the data storage rack.

In various implementations, the HDD 100 installed within the data storage rack may be replaceable without affecting other HDD installed within the data storage rack, and perhaps without taking the data storage rack out of service for replacement of the HDD 100. Further, the data storage rack may include greater or fewer of the IT equipment described above. Still further, the data storage rack may include multiples of any of the IT equipment described above.

Hard disc drives (HDDs) as used herein includes any magnetic disc storage system or jukebox having at least two or more storage platters (or magnetic discs) and one or more shared read/write players. Appearances of the cassettes, the shared read/write players, the storage platter 146, and other features of the HDD 100 are for illustration purposes only and the features are not drawn to scale. The various microelectronic components attached to the slider 164 may be referred to in total as a transducer head, and may include read components, write components, or both read and write components. The presently disclosed technology may apply to rotating disc storage drive technologies other than the magnetic domain HDD 100 depicted in FIG. 1 (e.g., optical disc drives).

Figure 2:
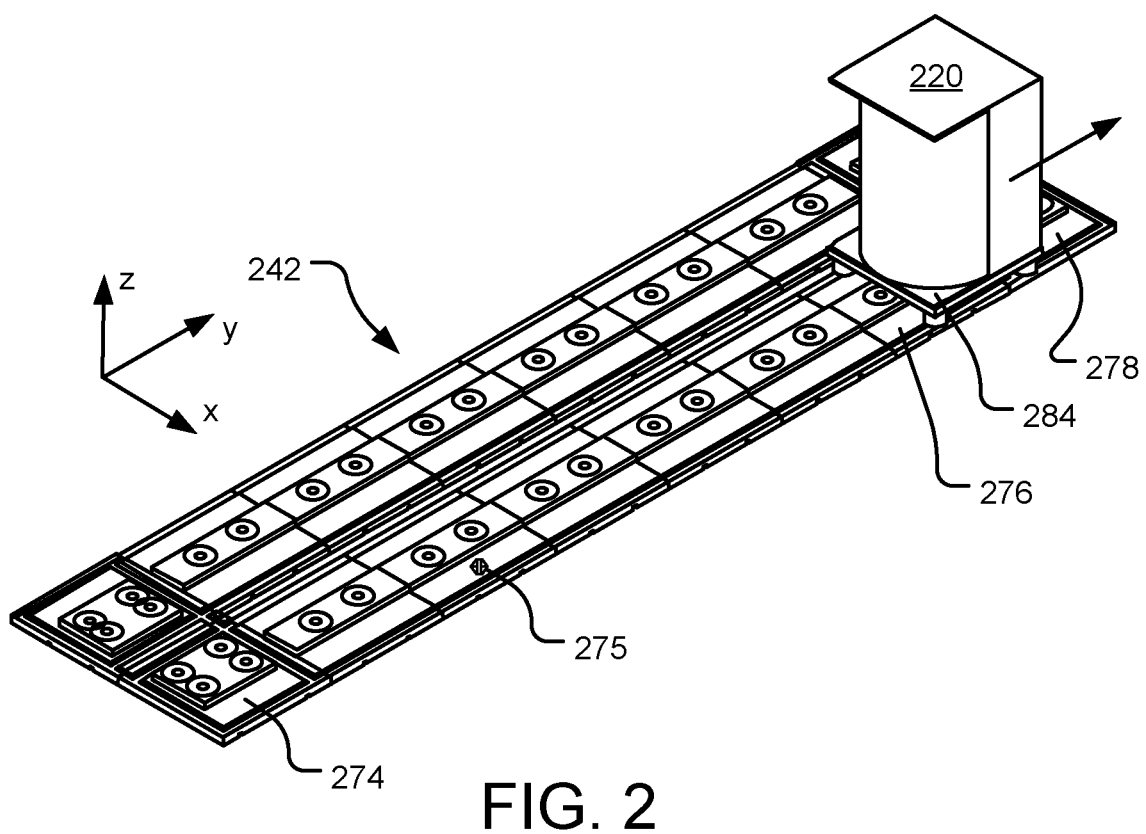
FIG. 2 illustrates an example magnetic rail assembly for magnetically repositioning a data storage cassette.

FIG. 2 illustrates an example magnetic rail assembly 242 for magnetically repositioning a data storage cassette 220. The magnetic rail assembly 242 is depicted in FIG. 2 with a singular data storage cassette 220 for clarity of illustration. In practice, many data storage cassettes may be positioned on the magnetic rail assembly 242, as illustrated in FIG. 1. The magnetic rail assembly 242 is an arrangement of magnetic tiles (e.g., magnetic tiles 274, 276, 278) that form a circuitous path (or circuit) that the data storage cassette 220 (and other data storage cassettes) may be moved along. A cassette position directly over each of the magnetic tiles is referred to herein as a cassette staging position.

The magnetic tiles illustrated in FIG. 2 take one of two forms and are modular so that the magnetic rail assembly 242 may be adapted to fit a desired enclosure specification. Here, the magnetic rail assembly 242 is a 2×8 arrangement of magnetic tiles. Though, any other arrangement of tiles equal to or greater than 2×2 is contemplated herein so long as it forms a circuitous path. Side magnetic tiles (e.g., magnetic tile 276) make up the long sides of the magnetic rail assembly 242 and permit movement along a singular axis only (here, depicted as the y-axis). End magnetic tiles (e.g., magnetic tiles 274, 278) make up the short sides of the magnetic rail assembly 242 and permit movement along two axes (here, depicted as the x-axis and the y-axis). As a result, the end magnetic tiles permit cassettes to change direction and turn a corner as the cassettes rounds corners of the circuitous path formed by the magnetic rail assembly 242.

Each of the magnetic tiles include one or more electromagnets. Here, the side magnetic tiles each include two electromagnets and the end magnetic tiles each include four electromagnets. The electromagnets are selectively energized to drive the data storage cassette 220 forward (or backward) along the magnetic rail assembly 242. For example, cassette 220 is propelled forward in the y-direction by the electromagnets in magnetic tiles 276, 278 energizing with a polarity to both push and pull the cassette 220 forward, as discussed in further detail below with reference to FIGS. 4-5.

The cassette 220 includes a cassette pallet (e.g., pallet 284) that interfaces with the magnetic rail assembly 242 and constrains movement of the cassette 220 along the circuitous path defined by the magnetic rail assembly 242. In various implementations, the cassette pallet may include permanent magnets to facilitate movement of the cassette 220 or be merely made of a ferromagnetic or paramagnetic material that responds to the electromagnets within the magnetic tiles.

In some implementations, the magnetic tiles are equipped with position sensors (e.g., position sensor 275) to detect the presence and location of the cassette 220 on the magnetic rail assembly 242. The position sensors may be optical sensors or magnetic sensors and may provide feedback in a closed loop to control operation of the various electromagnets within the magnetic rail assembly 242. Further, the electromagnets within the magnetic rail assembly 242 may be controlled with an on/off stepwise function or a sloped driving function. The sloped driving function may permit the cassette 220 to accelerate toward an intended cassette staging position more gradually and decelerate as it arrives at the intended cassette staging position. Further, rubber bumpers may be added to the cassette 220 as a back-up structure to cushion any impact with adjacent cassettes, particularly as the cassettes are in motion.

Figure 3:
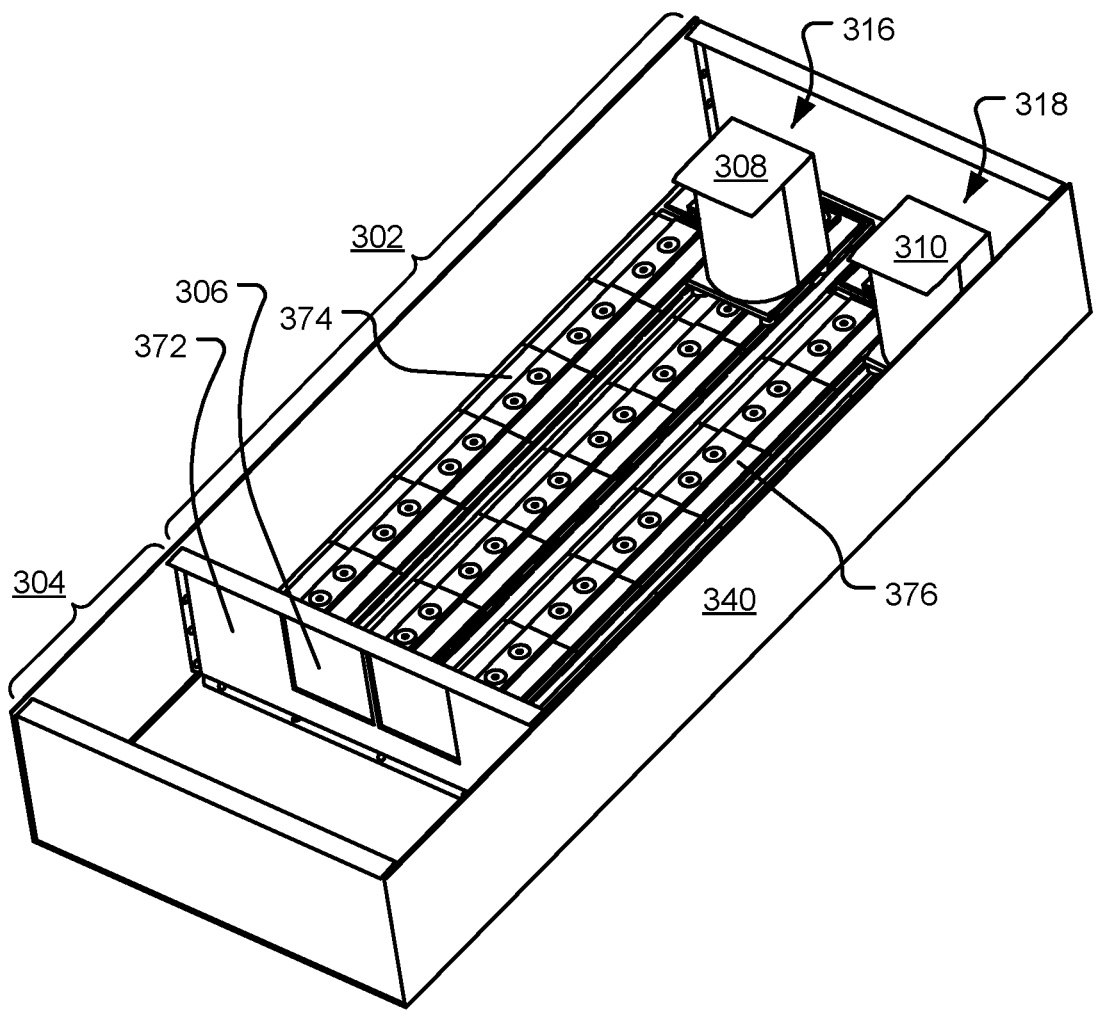
FIG. 3 illustrates an example HDD enclosure including dual magnetic rail assemblies for repositioning data storage cassettes therein.

FIG. 3 illustrates an example hard disc drive (HDD) enclosure 340 including dual magnetic rail assemblies 316, 318 for repositioning data storage cassettes 308, 310 thereon. The magnetic rail assemblies 316, 318 are depicted in FIG. 3 each with a singular data storage cassette 308, 310, respectively, for clarity of illustration. In practice, many data storage cassettes may be positioned each of the magnetic rail assemblies 316, 318, as illustrated in FIG. 1. The magnetic rail assemblies 316, 318 are each an arrangement of magnetic tiles (e.g., magnetic tiles 374, 376) that form a circuitous path (or circuit) that the data storage cassettes 308, 310, respectively, (and other data storage cassettes) may be moved along. A cassette position directly over each of the magnetic tiles is referred to herein as a cassette staging position.

The enclosure 340 divided into a cassette compartment 302 (including magnetic rail assemblies 316, 318 and cassettes 308, 310, respectively), a read/write compartment 304 (including one or more shared read/write assemblies and a robotic arm assembly (both not shown, see e.g., FIG. 1)), and a magnetic control compartment (including control circuitry for selectively actuating electromagnets embedded within the magnetic tiles making up the magnetic rail assemblies 316, 318, which is located underneath the cassette compartment, not shown), each of which is closed off from the others, primarily to isolate the cassette compartment 302 in the event of a failure event that occurs in the read/write compartment 304 or the magnetic control compartment. The enclosure 340 is illustrated without a top panel for the purposes of illustrating internal components, such as the magnetic rail assemblies 316, 318 and the cassettes 308, 310 within the cassette compartment 302.

The magnetic rail circuits 316, 318 each have predefined staging positions for cassettes directly over each magnetic tile. At least one of the staging positions in each of the magnetic rail circuits 316, 318 is accessible by a robotic arm assembly (not shown) and referred to herein as an active cassette position. The cassettes in each of the circuits 316, 318 may change position to vary which of the cassettes are in active cassette positions. Each of the cassettes 308, 310 includes a stack of storage platters (also referred to herein as data storage discs or magnetic discs) stored in an inactive state (referred to herein as inactive discs).

The enclosure 340 includes a cassette partition 372 and a cassette compartment door 306 that selectively permits the robotic arm assembly access through the cassette partition 372 to the cassette compartment 302 when open, and seals off the cassette compartment 302 from the read/write compartment 304 when closed. The cassette compartment door 306 is made up of a pair of sliding panels that slide away from one another to open and slide toward one another to abut when closed. When the cassette compartment door 306 is in the depicted closed position, any failure event that occurs in the read/write compartment 304 is isolated from the cassette compartment 302 and prevented from contaminating the storage platters stored within the cassettes 308, 310.

Figure 4:
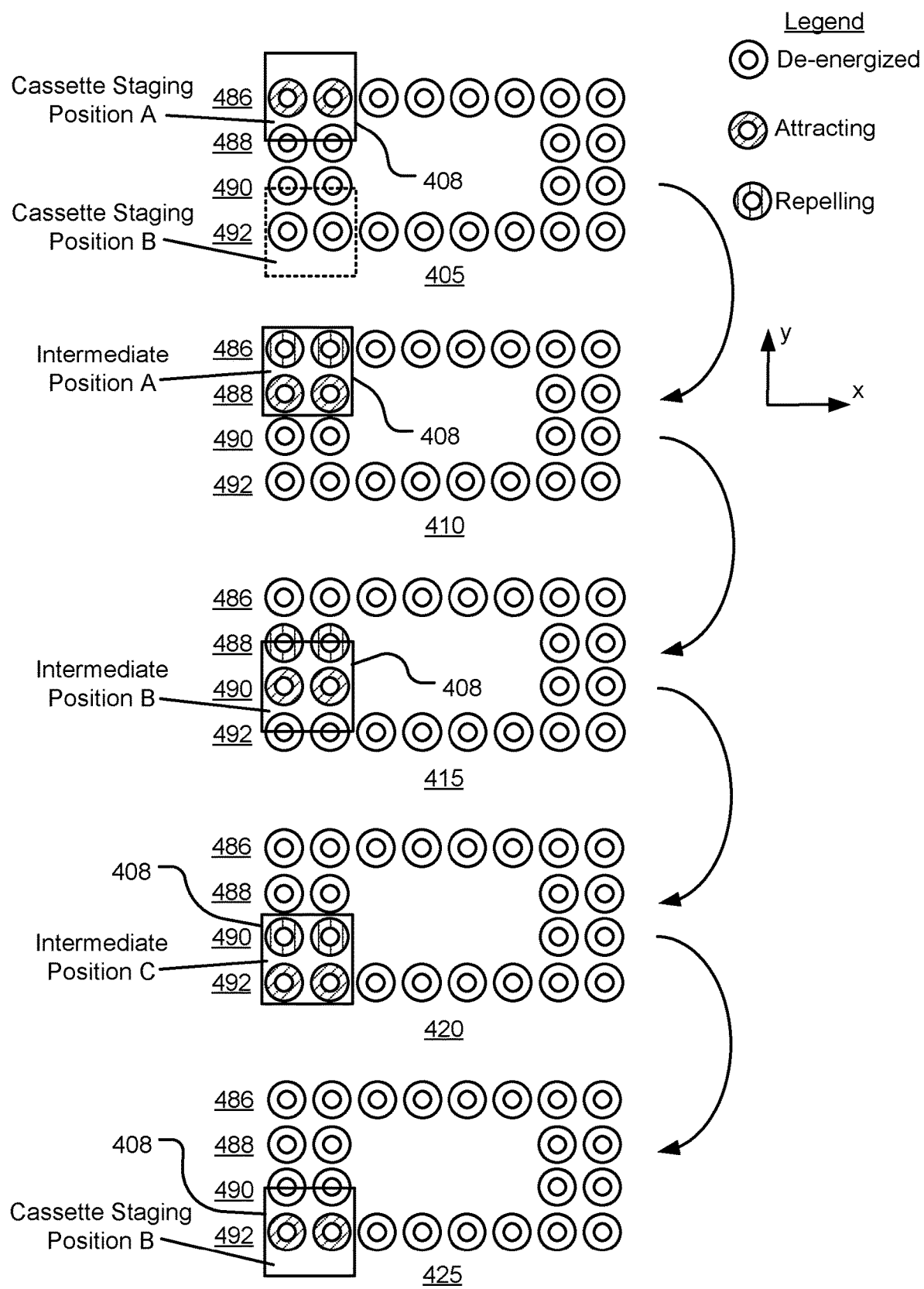
FIG. 4 illustrates a sequence of magnetization schematics to reposition a data storage cassette from cassette staging position A to cassette staging position B.

FIG. 4 illustrates a sequence of magnetization schematics 405, 410, 415, 420, 425 to reposition a data storage cassette 408 from cassette staging position A to cassette staging position B. The magnetization schematics 405, 410, 415, 420, 425 represent a plan view of an example magnetic rail circuit that permits the cassette 408 to selectively move in a circuitous manner about the magnetic rail circuit. The magnetic rail circuit is made up of a sequence of magnets, each with a N-S pole orientation extending in and out of the depicted view. The magnets are selectively de-energized, energized in a first current direction to drive an attracting force with the data storage cassette 408, and energized in a second opposite current direction to drive a repelling force with the data storage cassette 408, as illustrated by the Legend in FIG. 4.

The magnetic rail assembly is depicted in FIG. 4 with a singular data storage cassette 408 for clarity of illustration. In practice, many data storage cassettes may be positioned on the magnetic rail assembly, as illustrated in FIG. 1. The cassette 408 may ride on a pallet (not shown, see e.g., pallet 884 of FIG. 8) that includes permanent magnets to facilitate movement of the cassette 408 or the pallet may be merely made of a ferromagnetic or paramagnetic material that reacts to the attracting/repelling forces triggered by energizing the magnets.

In some implementations, the magnetic rail circuit is made up of a sequence of magnetic tiles (not shown, see e.g., magnetic tiles 274, 276, 278 of FIG. 2). Side magnetic tiles each include two electromagnets and make up the long sides of the magnetic rail assembly and permit movement along a singular axis only (here, depicted as the x-axis). End magnetic tiles each include four electromagnets and make up the short sides of the magnetic rail assembly and permit movement along two axes (here, depicted as the x-axis and the y-axis). Movement of the data storage cassette 408 illustrated in FIG. 4 and described in detail immediately below may reference movement along the short sides of the magnetic rail assembly between corner tiles, for example. Movement of the data storage cassette 508 illustrated in FIG. 5 and described in detail further below may reference movement along the long sides of the magnetic rail assembly from a corner tile to a side tile, for example.

In magnetization schematic 405, the data storage cassette 408 is oriented in staging position A in a steady state. Staging position A corresponds to a position directly atop a magnetic corner tile including two "attracting" magnet pairings 486. The magnetic corner tile also includes two de-energized magnet pairings 488. The data storage cassette 408 remains centered over the two "attracting" magnet pairings 486 until called for movement.

When the data storage cassette 408 is called to move to staging position B, the magnetization schematic 410 illustrates a change of magnetization to drive movement of the data storage cassette 408 toward the staging position B. Specifically, the previously "attracting" magnet pairings 486 are reversed in polarity to make then "repelling" magnet pairings and the previously de-energized magnet pairings 488 are energized to be "attracting," which drives the cassette 408 to move in the negative y-direction, specifically to an intermediate position A.

The magnetization schematic 415 illustrates a change of magnetization to continue driving movement of the data storage cassette 408 toward the staging position B. Specifically, the previously "repelling" magnet pairings 486 are de-energized as the data storage cassette 408 moves out of range of the magnet pairings 486. Further, the previously "attracting" magnet pairings 488 are reversed in polarity to make then "repelling" magnet pairings and the previously de-energized magnet pairings 490 are energized to be "attracting," which drives the cassette 408 to continue to move in the negative y-direction, specifically to an intermediate position B.

The magnetization schematic 420 illustrates a change of magnetization to continue driving movement of the data storage cassette 408 toward the staging position B. Specifically, the previously "repelling" magnet pairings 488 are de-energized as the data storage cassette 408 moves out of range of the magnet pairings 488. Further, the previously "attracting" magnet pairings 490 are reversed in polarity to make then "repelling" magnet pairings and the previously de-energized magnet pairings 492 are energized to be "attracting," which drives the cassette 408 to continue to move in the negative y-direction, specifically to an intermediate position C.

As the data storage cassette 408 reaches the staging position B, the magnetization schematic 425 illustrates a steady state where the data storage cassette 408 is positioned directly atop a magnetic corner tile including two "attracting" magnet pairings 492. The magnetic corner tile also includes two de-energized magnet pairings 490, which are now de-energized. The data storage cassette 408 remains centered over the two "attracting" magnet pairings 492 until called for further movement.

While intermediate positions A-C are described with reference to FIG. 4 as distinct positions within the magnetic rail circuit, the data storage cassette 408 may move smoothly from the staging position A to the staging position B as a magnetic rail controller (not shown, see e.g., magnetic rail controller 126 of FIG. 1) manipulates the magnetization of the magnet pairings 486, 488, 490, 492 along the path of the data storage cassette 408 between the staging positions A and B.

Figure 5:
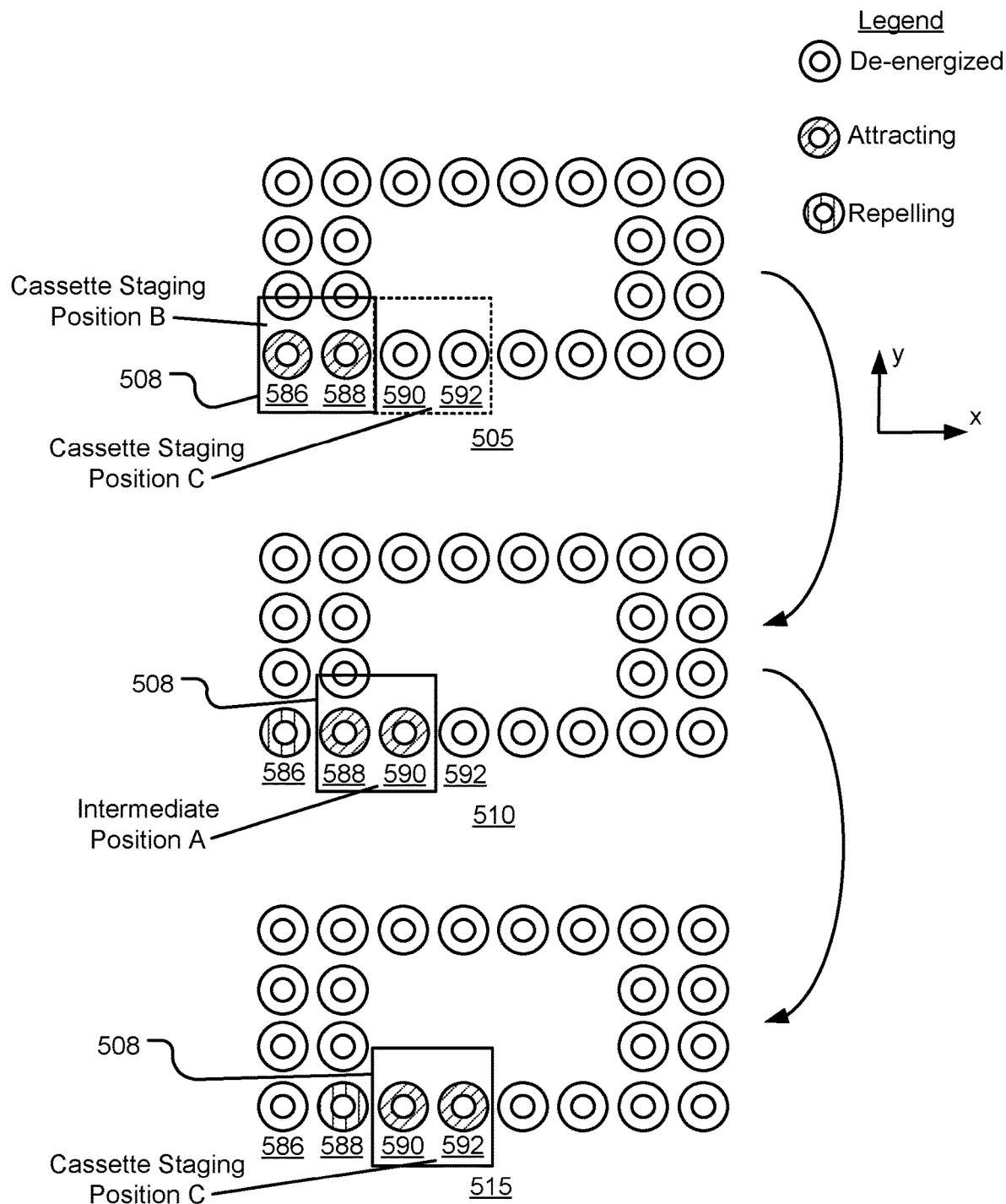
FIG. 5 illustrates a sequence of magnetization schematics to reposition a data storage cassette from cassette staging position B to cassette staging position C.

FIG. 5 illustrates a sequence of magnetization schematics 505, 510, 515 to reposition a data storage cassette 508 from cassette staging position B to cassette staging position C. The magnetization schematics 505, 510, 515 represent a plan view of an example magnetic rail circuit that permits the cassette 508 to selectively move in a circuitous manner about the magnetic rail circuit. The magnetic rail circuit is made up of a sequence of magnets, each with a N-S pole orientation extending in and out of the depicted view. The magnets are selectively de-energized, energized in a first current direction to drive an attracting force with the data storage cassette 508, and energized in a second opposite current direction to drive a repelling force with the data storage cassette 508, as illustrated by the Legend in FIG. 5.

The magnetic rail assembly is depicted in FIG. 5 with a singular data storage cassette 508 for clarity of illustration. In practice, many data storage cassettes may be positioned on the magnetic rail assembly, as illustrated in FIG. 1. The cassette 508 may ride on a pallet (not shown, see e.g., pallet 884 of FIG. 8) that includes permanent magnets to facilitate movement of the cassette 508 or the pallet may be merely made of a ferromagnetic or paramagnetic material that reacts to the attracting/repelling forces triggered by energizing the magnets.

In some implementations, the magnetic rail circuit is made up of a sequence of magnetic tiles (not shown, see e.g., magnetic tiles 274, 276, 278 of FIG. 2). Side magnetic tiles each include two electromagnets and make up the long sides of the magnetic rail assembly and permit movement along a singular axis only (here, depicted as the x-axis). End magnetic tiles each include four electromagnets and make up the short sides of the magnetic rail assembly and permit movement along two axes (here, depicted as the x-axis and the y-axis). Movement of the data storage cassette 408 illustrated in FIG. 4 and described in detail above may reference movement along the short sides of the magnetic rail assembly between corner tiles, for example. Movement of the data storage cassette 508 illustrated in FIG. 5 and described in detail immediately below may reference movement along the long sides of the magnetic rail assembly from a corner tile to a side tile, for example.

In magnetization schematic 505, the data storage cassette 508 is oriented in staging position B in a steady state. Staging position B corresponds to a position directly atop a magnetic corner tile including two "attracting" magnets 586, 588. The data storage cassette 508 remains centered over the two "attracting" magnets 586, 588 until called for movement.

When the data storage cassette 508 is called to move to staging position C, the magnetization schematic 510 illustrates a change of magnetization to drive movement of the data storage cassette 508 toward the staging position C. Specifically, the previously "attracting" magnet 586 is reversed in polarity to make it a "repelling" magnet, the "attracting" magnet 588 maintains its "attracting" polarity, and the previously de-energized magnet 490 is energized to be "attracting," which drives the cassette 508 to move in the x-direction, specifically to an intermediate position A.

The magnetization schematic 515 illustrates a change of magnetization to continue driving movement of the data storage cassette 508 toward the staging position C. Specifically, the previously "repelling" magnet 586 is de-energized as the data storage cassette 408 moves out of range of the magnet 586. Further, the previously "attracting" magnet 588 is reversed in polarity to make it a "repelling" magnet, the "attracting" magnet 590 maintains its "attracting" polarity, and the previously de-energized magnet 592 is energized to be "attracting," which drives the cassette 508 to continue to move in the x-direction, specifically to the staging position C.

Once the cassette 508 reaches the staging position C, the magnetization schematic 515 may be changed by de-energizing the magnet 588, but maintaining the "attracting" polarity of magnets 590, 592. This maintains a steady state where the data storage cassette 508 is positioned directly atop a magnetic side tile including the two "attracting" magnets 590, 592. The data storage cassette 508 remains centered over the two "attracting" magnets 590, 592 until called for further movement.

While intermediate position A is described with reference to FIG. 5 as a distinct position within the magnetic rail circuit, the data storage cassette 508 may move smoothly from the staging position B to the staging position C as a magnetic rail controller (not shown, see e.g., magnetic rail controller 126 of FIG. 1) manipulates the magnetization of the magnets 586, 588, 590, 592 along the path of the data storage cassette 508 between the staging positions B and C.

A variety of alternative magnetic rail circuit arrangements are contemplated herein. For example, the magnetic rail circuit may take the form of an oval racetrack configuration, with a pair of electromagnets defining each staging position and the permitting the data storage cassette 508 to rotate as it rounds the ends of the magnetic rail circuit. This implementation contrasts with the implementation depicted in FIG. 5 in that the data storage cassette 508 does not rotate in the implementation of FIG. 5. Further, the oval racetrack configuration may omit a full empty staging position (as contrasted with the empty staging positions shown in FIG. 1). Another alternative magnetic rail circuit arrangement may incorporate a third dimension by using elevator tiles extending in the z-direction.

Figure 6:
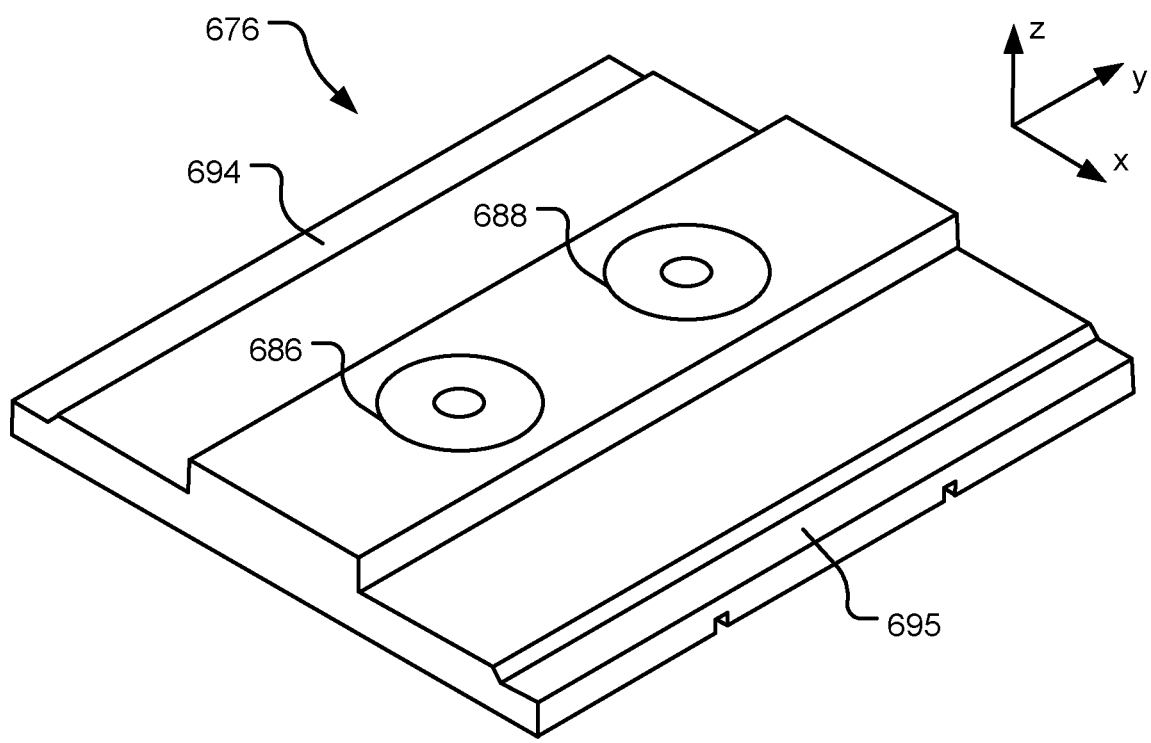
FIG. 6 illustrates an example modular side tile for a magnetic rail assembly.

FIG. 6 illustrates an example modular side tile 676 for a magnetic rail assembly (not shown, see e.g., magnetic rail assembly 242 of FIG. 2). The magnetic rail assembly may be made up of modular tiles of two forms, side magnetic tiles, such as modular side tile 676 and end magnetic tiles, such as end magnetic tile 774 of FIG. 7. The side magnetic tiles make up the long sides of the magnetic rail assembly and permit movement along a singular axis only (here, depicted as the y-axis).

Each of the magnetic tiles include one or more electromagnets. Here, the side magnetic tile 676 includes two electromagnets 686, 688, each with a N-S pole orientation along the z-direction. In other implementations, there may only be one electromagnet embedded in the magnetic tile 676 if the force generated by a singular electromagnet is sufficient to reliably move a corresponding magnetic pallet. The electromagnets 686, 688 are selectively energized to drive a data storage cassette (not shown, see e.g., data storage cassette 220 of FIG. 2) forward (or backward) along the magnetic rail assembly. The side magnetic tile 676 further includes tracks 694, 695 also oriented in the y-direction to ensure that the cassette stays centered in the x-direction on the magnetic tile 676 and adjacent magnetic tiles as it is driven in the positive and/or negative y-directions. In various implementations, the magnetic tile 676 may be made of plastic or aluminum to not substantially affect the function of the electromagnets 686, 688.

Figure 7:
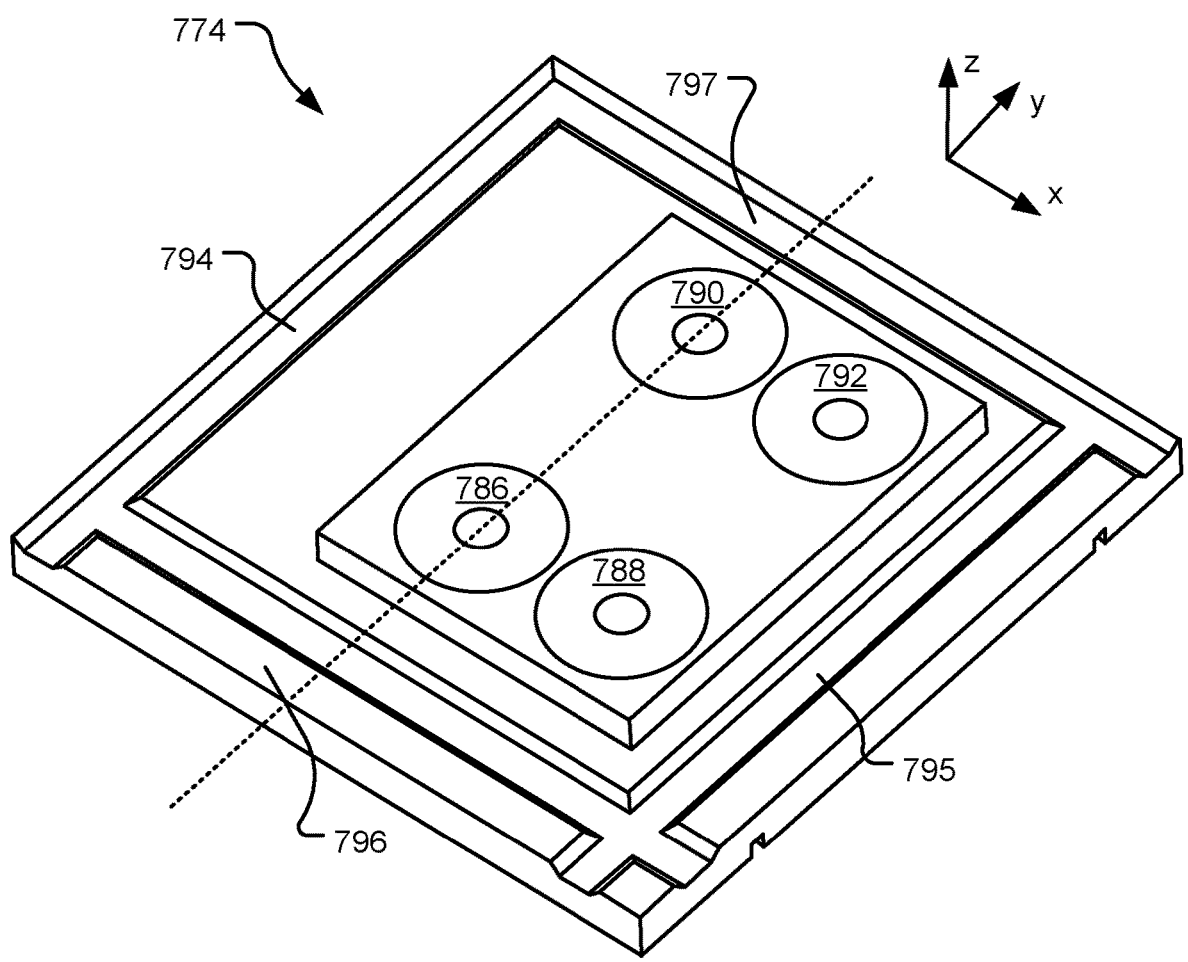
FIG. 7 illustrates an example modular corner tile for a magnetic rail assembly.

FIG. 7 illustrates an example modular end (or corner) tile 774 for a magnetic rail assembly (not shown, see e.g., magnetic rail assembly 242 of FIG. 2). The magnetic rail assembly may be made up of modular tiles of two forms, side magnetic tiles, such as modular side tile 676 of FIG. 6 and end magnetic tiles, such as end magnetic tile 774. The end magnetic tiles make up the short sides of the magnetic rail assembly and permit movement along two axes (here, depicted as the x-axis and the y-axis). As a result, the end magnetic tiles permit cassettes to change direction and turn a corner as the cassettes rounds corners of the circuitous path formed by the magnetic rail assembly.

Each of the magnetic tiles include one or more electromagnets. Here, the end magnetic tile 774 includes four electromagnets 786, 788, 790, 792, each with a N-S pole orientation along the z-direction. The electromagnets 786, 790 lie along a dotted centerline of the magnetic tile 774 and when energized in an "attracting" manner, hold a corresponding data storage cassette (not shown, see e.g., data storage cassette 220 of FIG. 2) centered over the magnetic tile 774. In other implementations, there may only be one or two electromagnets embedded in the magnetic tile 676 if the force generated by one or two electromagnets is sufficient to reliably move a corresponding magnetic pallet. Further, the four electromagnets 786, 788, 790, 792 is helpful as the x-y rotation of the magnetic tile 676 does not change as it traverses the magnetic rail assembly.

Further, the electromagnets 786, 788, 790, 792 are selectively energized to drive the data storage cassette forward (or backward) along the magnetic rail assembly in the x-direction or the y-direction. The end magnetic tile 774 further includes tracks 794, 795 oriented in the y-direction to ensure that the cassette stays centered in the x-direction on the magnetic tile 774 and adjacent magnetic tiles as it is driven in the positive and/or negative y-directions. Similarly, the end magnetic tile 774 further includes tracks 796, 797 oriented in the x-direction to ensure that the cassette stays centered in the y-direction on the magnetic tile 774 and adjacent magnetic tiles as it is driven in the positive and/or negative x-directions. In various implementations, the magnetic tile 774 may be made of plastic or aluminum so as to not substantially affect the function of the electromagnets 786, 788, 790, 792.

Figure 8:
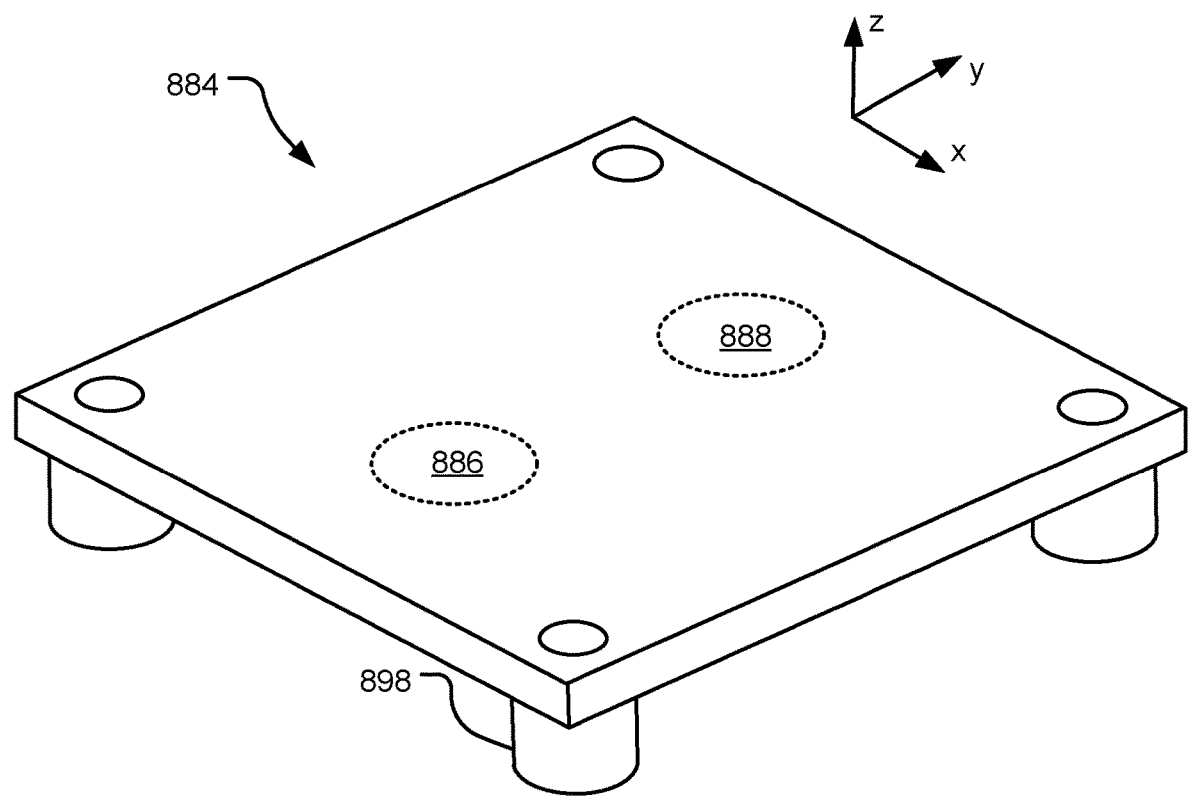
FIG. 8 illustrates an example magnetic pallet for a magnetically repositionable data storage cassette.

FIG. 8 illustrates an example magnetic pallet 884 for a magnetically repositionable data storage cassette (not shown, see e.g., data storage cassette 220 of FIG. 2). The magnetic pallet 884 serves as a carrying tray for the data storage cassette that interfaces with a magnetic rail assembly (not shown, see e.g., magnetic rail assembly 242 of FIG. 2) and constrains movement of the cassette along the circuitous path defined by the magnetic rail assembly. In various implementations, the cassette pallet may be made of plastic or aluminum and include permanent magnets 886, 888 embedded therein to facilitate movement of the cassette. The permanent magnets 886, 888 may have opposite N-S pole orientations along the z-direction to complement the similar N-S orientation of electromagnets embedded in the magnetic rail assembly. In other implementations, the magnetic pallet 884 may be made of a ferromagnetic, anti-ferromagnetic, or paramagnetic material that responds to the electromagnets embedded within the magnetic tiles.

The magnetic pallet 884 further includes four stanchions (e.g., stanchion 898) that support the magnetic pallet 884 a predefined distance and orientation over the magnetic rail assembly. Each of the stanchions may include a bearing (e.g., a plain, ball, or roller bearing) that seats in a corresponding track (not shown, see e.g., tracks 694, 695 of FIG. 6 and tracks 794, 795, 796, 797 of FIG. 7) of a magnetic tile of the magnetic rail assembly. The bearing provides a low friction engagement with the magnetic tile to facilitate movement of the magnetic pallet 884 with reference to the magnetic tile. In some implementations, the stanchions and/or bearings are omitted and the magnetic pallet 884 is magnetically suspended and centered above the magnetic tiles of the magnetic rail assembly.

Figure 9:
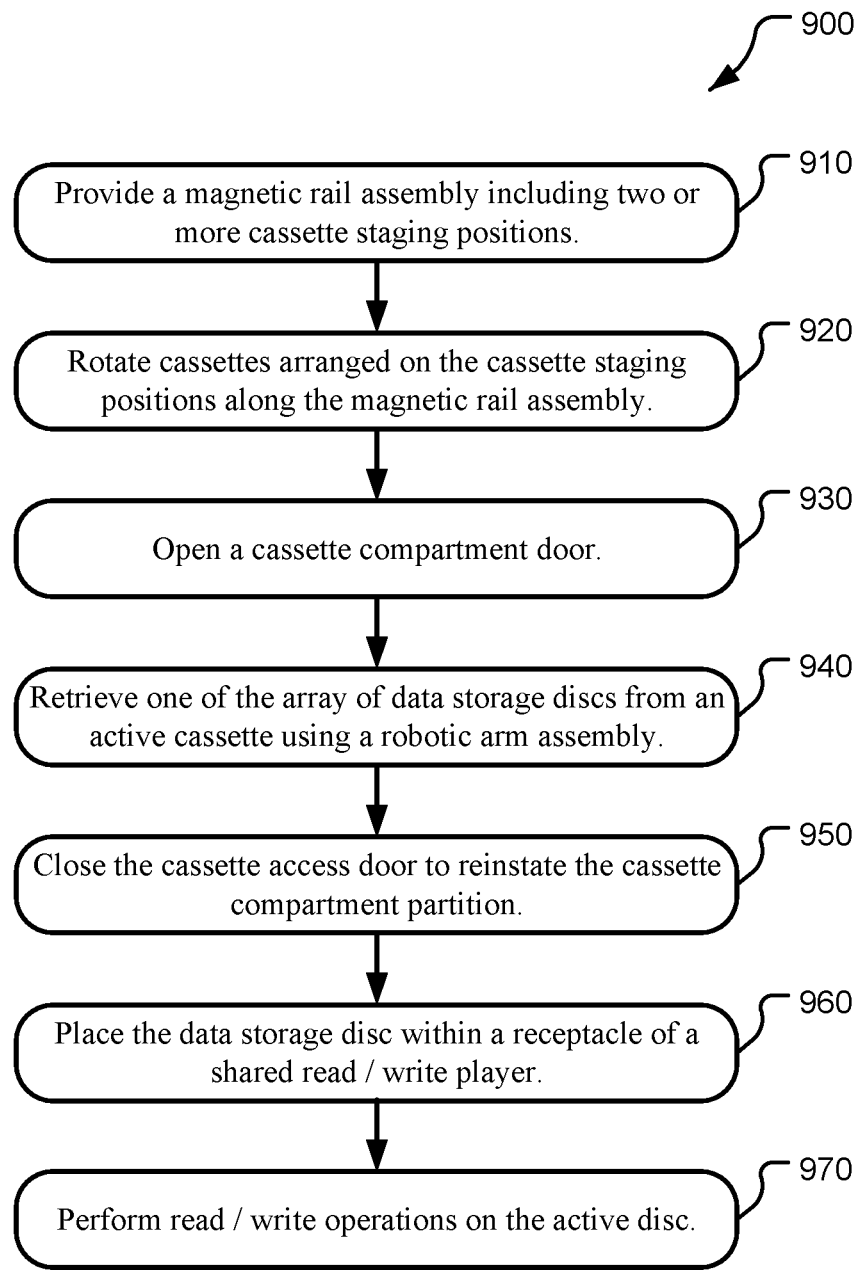
FIG. 9 illustrates example operations for operating an HDD with magnetically repositionable data storage cassettes and shared read/write players.

FIG. 9 illustrates example operations 900 for operating an HDD with magnetically repositionable data storage cassettes and shared read/write players. A providing operation 910 provides a magnetic rail assembly including two or more cassette staging positions. Each of the cassette staging positions includes one or more electromagnets and one of the cassette staging positions further defined as an active cassette position. The magnetic rail assembly is within an enclosure, specifically a cassette compartment for the HDD.

A rotating operation 920 rotates two or more cassettes arranged on the cassette staging positions of the magnetic rail assembly along the magnetic rail assembly. One of the cassettes arranged on the active cassette position is further defined as an active cassette. Each cassette includes an array of data storage discs. A cassette partition separates the two or more cassettes from a robotic arm assembly and the shared read/write player within an enclosure of the HDD. An opening operation 930 opens a cassette compartment door, the cassette compartment door to selectively permit a robotic arm assembly physical access to the cassette compartment from a read/write player compartment.

A retrieving operation 940 retrieves one of the array of data storage discs from the active cassette using the robotic arm assembly. The removed magnetic disc is intended to be used as an active disc within the HDD. A closing operation 950 closes the cassette access door to reinstate the partition between the cassette compartment and the read/write player compartment. A placing operation 960 places the data storage disc within a receptacle of the shared read/write player to further define the data storage disc as an active disc. A performing operation 970 may then perform data access operations (e.g., read and/or write operations) on the active disc using the shared read/write player.

The foregoing logical operations 900 may be implemented as logical steps in one or more computer systems (e.g., as a sequence of processor-implemented steps executing in one or more computer systems and as interconnected machine or circuit modules within one or more computer systems), such as computing system 1000 discussed below. The implementation is a matter of choice, dependent on the performance requirements of the computer system implementing the presently disclosed technology. Accordingly, the logical operations 900 may be referred to variously as operations, steps, objects, or modules. Furthermore, it should be understood that the logical operations 900 may be performed in any order, adding or replacing operations as desired, unless explicitly claimed otherwise or a specific order is inherently necessitated by the claim language.

FIG. 10 illustrates an example system diagram of a computing system 1000 suitable for operating an HDD 1003 with magnetically repositionable data storage cassettes and shared read/write players. The HDD 1003 includes an HDD controller 1042, which in turn includes a servo controller 1022, R/W controller 1024, arm controller 1032, magnetic rail controller 1026, and a door controller 1044. The HDD 1003 further includes a number of storage media platters (e.g., storage media platter 146 of FIG. 1) arranged in one or more cassettes, data on which is accessible via the servo controller 1022 and the R/W controller 1024 as described in detail above. The arm controller 1032 directs operation of a magnetic arm assembly that selectively retrieves storage media platters from the data storage cassettes and places the retrieved storage media platters within the shared read/write players. The magnetic rail controller 1026 controls the position of the data storage cassettes on a magnetic rail assembly. The door controller 1044 directs operation of the internal access doors and thus physical access to the cassettes and the shared read/write player(s).

Server 1008 manages access to the HDD 1003 via a data storage rack switch 1001, which interconnects IT components within a data storage rack or other computing system. The server 1008 includes major subsystems such as a processor 1005, system storage 1007 (such as random-access memory (RAM) and read-only memory (ROM)), an input/output (I/O) controller 1009, removable storage (such as a memory card) 1023, a power supply 1029, and external devices such as a display screen 1015 via a display adapter 1011, and various input peripherals 1013 (e.g., a mouse, trackpad, keyboard, touchscreen, joystick, and/or smart card acceptance device). Wireless interface 1025 together with a wired network interface 1027, may be used to interface to the HDD 1003, a data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 10 to be present to practice the presently disclosed technology. Furthermore, devices and components thereof may be interconnected in different ways from that shown in FIG. 10. Code (e.g., computer software, including mobile applications (apps) to implement the presently disclosed technology may be operably disposed in the HDD 1003, the system storage 1007, and/or the removable storage 1023.

The computing system 1000 may include a variety of tangible computer-readable storage media (e.g., the HDD 1003, the system storage 1007, and/or the removable storage 1023) and intangible computer-readable communication signals. Tangible computer-readable storage can be embodied by any available media that can be accessed by the computing system 1000 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the computing system 1000.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A data storage device comprising:
   a magnetic rail assembly including two or more cassette staging positions, each of the cassette staging positions including one or more electromagnets and one of the cassette staging positions further defined as an active cassette position;
   two or more cassettes arranged on the cassette staging positions of the magnetic rail assembly, one of the cassettes arranged on the active cassette position further defined as an active cassette and each cassette including an array of data storage discs; and
   a shared read/write player to selectively receive one of the data storage discs from the active cassette as an active disc, the shared read/write player to perform a data access operation on the active disc.

2. The data storage device of claim 1, further comprising:
   a robotic arm assembly positioned adjacent the active cassette, the robotic arm assembly to selectively retrieve a data storage disc from the active cassette and place the data storage disc within a receptacle of the shared read/write player to further define the data storage disc as an active disc.

3. The data storage device of claim 2, further comprising:
   a cassette partition separating the cassettes from the robotic arm assembly and the shared read/write player within an enclosure of the data storage device.

4. The data storage device of claim 3, further comprising:
   one or more internal access doors in the cassette partition, the internal access doors to selectively permit the robotic arm assembly access through the cassette partition to the cassettes.

5. The data storage device of claim 1, wherein the magnetic rail assembly includes a series of modular tiles arranged to form a circuitous path.

6. The data storage device of claim 5, wherein the one or more electromagnets at each of the cassette staging positions are embedded within the modular tiles.

7. The data storage device of claim 6, wherein the modular tiles are each one of side magnetic tiles and end magnetic tiles.

8. The data storage device of claim 7, wherein two electromagnets are embedded within each of the side magnetic tiles and four electromagnets are embedded within each of the end magnetic tiles.

9. The data storage device of claim 5, wherein the cassettes are each mounted to a magnetic pallet that maintains a distance and orientation of the cassettes with reference to the modular tiles.

10. The data storage device of claim 9, wherein the magnetic pallets include permanent magnets to facilitate movement of the cassettes.

11. The data storage device of claim 9, wherein the modular tiles include tracks, and the magnetic pallets include stanchions that engage the tracks to maintain orientation of the magnetic pallets with the modular tiles.

12. The data storage device of claim 1, wherein the shared read/write player includes:
    a platter spindle to spin the active disc;
    a read/write arm to selectively access a track on the active disc;
    a read element to selectively read data from the active disc; and
    a write element to selectively write data to the active disc.

13. The data storage device of claim 1, wherein the data storage discs are magnetic discs and the data storage device is a hard disc drive.

14. A method of operating a data storage device comprising:
- providing a magnetic rail assembly including two or more cassette staging positions, each of the cassette staging positions including one or more electromagnets and one of the cassette staging positions further defined as an active cassette position;
- rotating two or more cassettes arranged on the cassette staging positions of the magnetic rail assembly along the magnetic rail assembly, one of the cassettes arranged on the active cassette position further defined as an active cassette and each cassette including an array of data storage discs; and
- receiving one of the data storage discs from the active cassette as an active disc to a shared read/write player, the shared read/write player to perform a data access operation on the active disc.

15. The method of claim 14, further comprising:
- retrieving a data storage disc from the active cassette using a robotic arm assembly positioned adjacent the active cassette; and
- placing the data storage disc within a receptacle of the shared read/write player to further define the data storage disc as an active disc.

16. The method of claim 15, wherein a cassette partition separates the cassettes from the robotic arm assembly and the shared read/write player within an enclosure of the data storage device, further comprising:
- opening a cassette compartment door, the cassette compartment door to selectively permit the robotic arm assembly physical access to a cassette compartment; and
- closing the cassette compartment door prior to the placing operation.

17. A hard disc drive comprising:
- a first magnetic rail assembly including two or more cassette staging positions, each of the cassette staging positions including one or more electromagnets and one of the cassette staging positions further defined as an first active cassette position;
- a second magnetic rail assembly including two or more cassette staging positions, each of the cassette staging positions including one or more electromagnets and one of the cassette staging positions further defined as a second active cassette position;
- two or more cassettes arranged on the cassette staging positions of the first magnetic rail assembly, one of the cassettes arranged on the first active cassette position further defined as an first active cassette and each cassette including an array of data storage discs;
- two or more cassettes arranged on the cassette staging positions of the second magnetic rail assembly, one of the cassettes arranged on the second active cassette position further defined as an second active cassette and each cassette including an array of data storage discs; and
- a stack of shared read/write players, each shared read/write player to selectively receive one of the data storage discs from one or both of the first active cassette and the second active cassette as an active disc, the shared read/write players to perform data access operations on the active disc.

18. The hard disc drive of claim 17, further comprising:
a robotic arm assembly positioned adjacent the first and the second active cassettes, the robotic arm assembly to selectively retrieve a data storage disc from the first and the second active cassettes and place the data storage disc within a receptacle of one of the shared read/write players to further define the data storage disc as an active disc.

19. The hard disc drive of claim 18, further comprising:
a cassette partition separating the cassettes from the robotic arm assembly and the shared read/write players within an enclosure of the hard disc drive.

20. The hard disc drive of claim 19, further comprising:
one or more internal access doors in the cassette partition, the internal access doors to selectively permit the robotic arm assembly access through the cassette partition to the cassettes.

* * * * *